March 24, 1936.   N. H. NELSON   2,034,824
WHEELED TOY
Filed Aug. 14, 1933   2 Sheets-Sheet 2
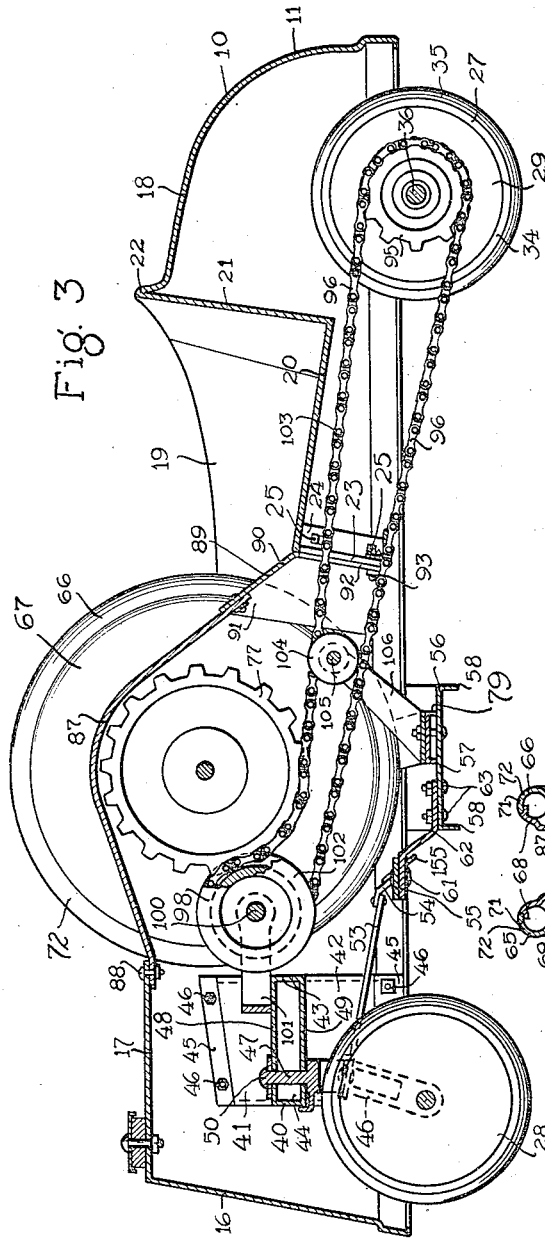
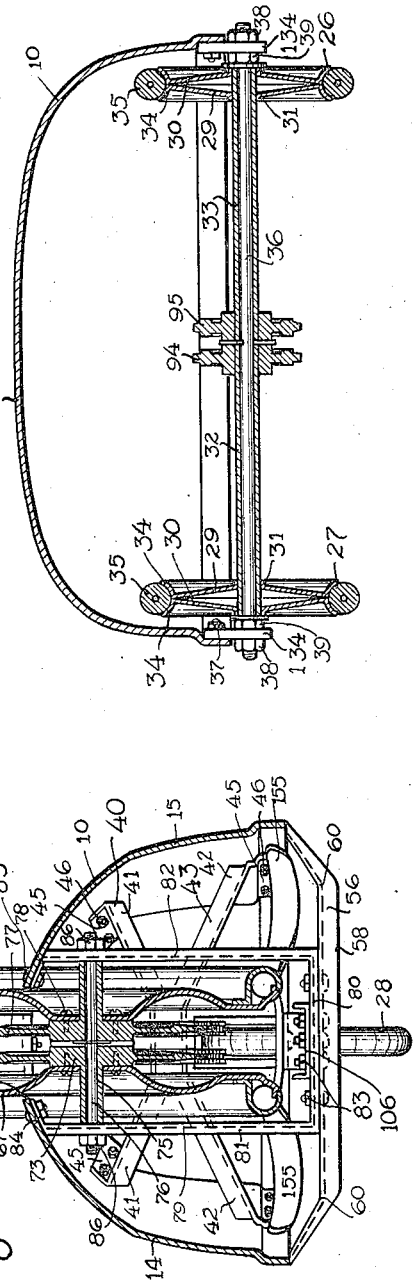
Inventor
Nels H. Nelson
By Caswell & Lagaard
Attorneys Patented Mar. 24, 1936

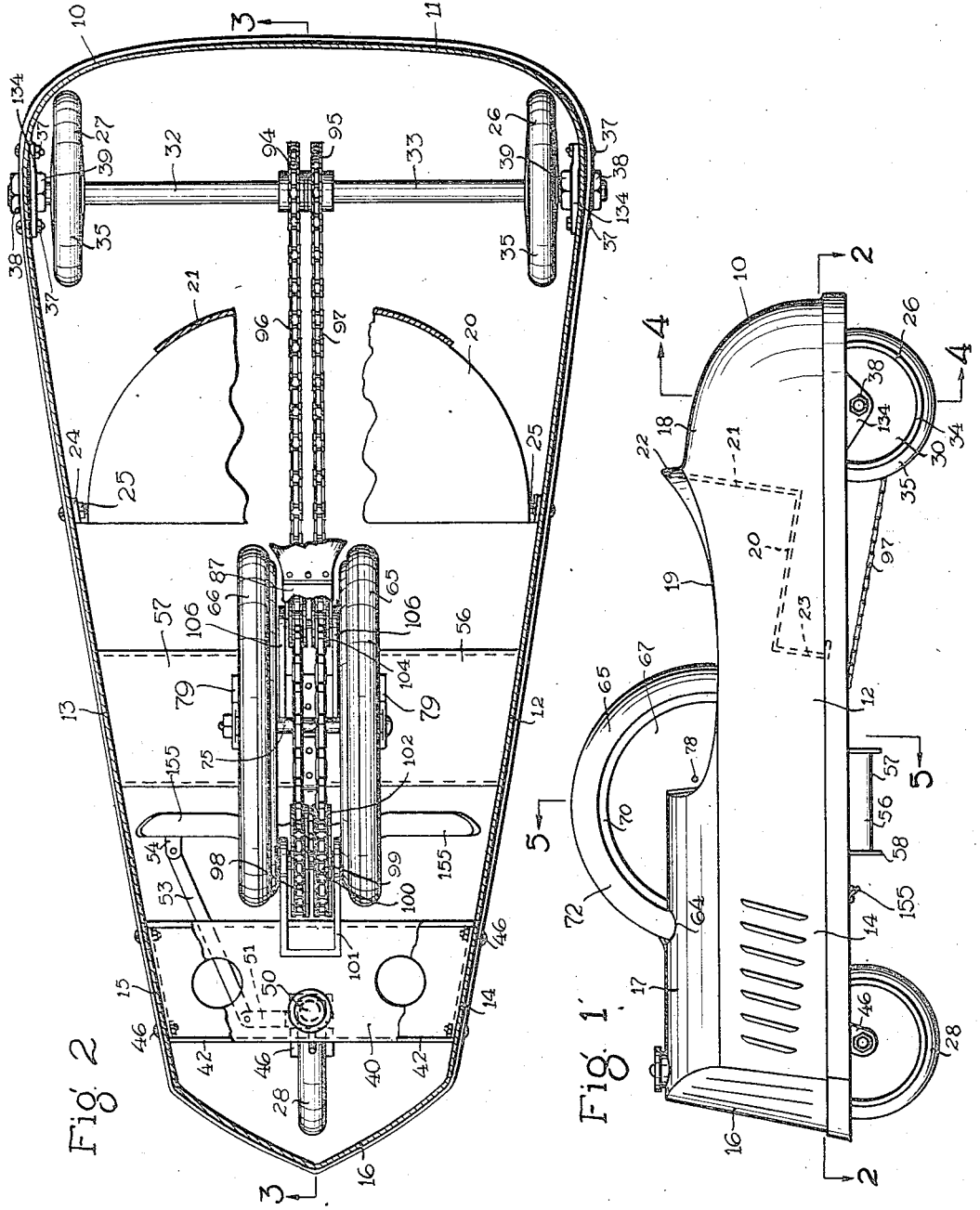

2,034,824

UNITED STATES PATENT OFFICE 2,034,824

WHEELED TOY

Nels H. Nelson, Minneapolis, Minn., assignor of one-half to G. E. Norberg, St. Paul, Minn.

Application August 14, 1933, Serial No. 684,959

13 Claims. (Cl. 208—32)

My invention relates to wheeled toys and particularly to vehicles for use by children.

An object of the invention resides in providing a vehicle having a driving wheel and a hand wheel connected thereto by means of which the vehicle may be propelled.

Another object of the invention resides in constructing the vehicle with a body having a seat therein in which the operator is stationed and in disposing the hand wheel for operation of the vehicle in a manner to be straddled by the legs of the operator when seated upon the seat.

A still further object of the invention resides in arranging the hand wheel in a vertical position with the upper portion of the hand wheel projecting upwardly above the vehicle proper where the same may be readily grasped by the hands of the user.

An object of the invention resides in providing a drive between the hand wheel and driving wheel by means of which overhand movement of the wheel at the upper portion of the same and toward the occupant of the seat will procure propulsion of the vehicle in a forward direction.

Another object of the invention resides in providing a pulley or sprocket on the hand wheel and a similar pulley or sprocket connected to the driving wheel and in further providing a chain or belt connecting said sprockets or pulleys by means of which the driving wheel may be rotated.

A feature of the invention resides in arranging the sprocket connected to the hand wheel so that the lowermost portion thereof engages the forwardly traveling run of the chain whereby forward movement of the vehicle is procured through movement of the hand wheel in a reverse direction as compared to the direction of rotation of the driving wheel.

An object of the invention resides in running the chain over an idler positioned in close proximity to the sprocket operated by the hand wheel whereby the chain is prevented from being disengaged from said sprocket.

A feature of the invention resides in running the chain beneath the seat of the vehicle where the same is out of the way.

Other objects of the invention reside in the novel combination and arrangement of parts and in the details of construction hereinafter illustrated and/or described.

In the drawings:

Fig. 1 is an elevational view of a vehicle illustrating an embodiment of my invention.

Fig. 2 is a plan sectional view taken substantially on line 2—2 of Fig. 1 and drawn to a larger scale.

Fig. 3 is an elevational sectional view taken substantially on line 3—3 of Fig. 2.

Fig. 4 is an elevational sectional view taken on line 4—4 of Fig. 1 and drawn to a larger scale.

Fig. 5 is a transverse sectional view taken on line 5—5 of Fig. 1 and drawn to a larger scale.

Heretofore the customary manner of propelling children's vehicles has been to provide cranks and linkage connected therewith by means of which rotary movement could be imparted to the wheels of the vehicle. Such construction causes dead centers which make propulsion of the vehicle difficult. The present invention provides a simple and effective construction whereby the vehicle may be positively propelled regardless of the position of the propelling mechanism.

My invention proper comprises a body 10 which is constructed in the shape of the body of a motor vehicle being provided with a back 11, sides 12 and 13, said sides terminating in hood-like portions 14 and 15 having an imitation radiator 16 at the extreme front of the same. A hood 17 covers the forward portion of the body while a covering 18 at the rear is connected to the back 10 and sides 12 and 13. This construction leaves an opening 19 in the center of the body through which access to the interior of the body is had and in which the occupant is stationed. A seat 20 is disposed within the interior of the body proper and is constructed with a back rest 21 connected to the marginal portion 22 of the covering 18 and with a drop board 23 projecting downwardly therefrom and extending completely across the two sides 12 and 13. The seat structure may be attached to the sides 12 and 13 through ears 24 formed on the board 23 which ears are bolted to the said sides through bolts 25. The upper portion of the back rest 21 is welded to the marginal portion 22 of the covering 18.

The vehicle body 10 is supported at the rear through rear wheels 26 and 27. These wheels are preferably of the rubber tired type and are constructed with disks 29 and 30 arranged face to face and formed with hubs 31 at their centers by means of which the said disks may be attached to two tubular shafts 32 and 33. Such hubs are preferably welded or otherwise permanently secured to the said shafts. The outer edges of said disks are constructed with flanges 34 which form rims for the reception of rubber tires 35 carried by said rims. The two wheels 26 and 27 are journaled on an axle 36 which extends through the tubular shafts 32 and 33. This axle is hung in two brackets 134 secured to the sides 12 and 13 of the body 10 and depending therefrom. Brackets 134 are bolted to said body through bolts 37 and project downwardly below the lower edges thereof being formed with openings through which the axle 36 passes. Each end of said axle is threaded to receive two nuts 38 and 39 disposed one on each side of the respective brackets 134 by means of which the said axle may be rigidly attached to said brackets and held immovable with respect thereto. By means of this construction the two shafts 32 and 33 with the wheels 26 and 27 attached thereto are journaled for rotation and held from edgewise movement.

At the forward portion of the body 10 where the hood-like members 14 and 15 are located is provided a transverse frame member 40. This frame member consists of two U-shaped channel sections 41 and 42 of which the flanges 43 at the intermediate portions thereof are welded together to form a box-like structure 44 at the center of the frame. Ears 45 are turned up at the ends of these channel sections which are bolted to the portions 14 and 15 of the body 10 through bolts 46. The transverse frame member 40 provides a support for a steering wheel 28 situated at the forward portion of the vehicle as well as other structures of the invention to be presently described.

Near the center of the body 10 is provided another transverse frame member 56 which is channel shaped, being formed with a web 57 and flanges 58 depending therefrom. This frame member is secured to the lowermost portion of the sides 12 and 13 of the body 10 through welding or the same may be attached thereto by the formation of ears on the said frame member which may be bolted to said body the same as the frame member 40. The frame member 56 is underslung as indicated at 60 to provide sufficient room within the interior of the body for the manipulation of the operating mechanism and for steering the steering wheel 28.

The steering wheel 28 is of the same construction as the driving wheels 26 and 27 and is rotatably mounted in a fork 46 which is formed at its upper end with a trunnion 47. This trunnion passes through the two webs 48 and 49 of the channel sections 41 and 42 and by means of which the box-like structure 44 is formed and is journaled for rotation in these parts of the transverse frame member. The upper end 50 of the trunnion 47 is riveted over to hold the said trunnion in place. The front wheel 28 serves as a steering wheel and is steered by means of an arm 51 which extends outwardly from the fork 46 and is securely attached thereto through welding or otherwise. This arm has pivoted to it a link 53 which in turn is pivoted to a lug 54 formed on a swinging steering bar 55. The bar 55 is pivoted at its center through a rivet 61 to a bracket 62. Bracket 62 is secured to the web 57 of the transverse frame member 56 through bolts 63. At the ends of the bar 55 are formed foot rests or pedals 155 adapted to be engaged by the feet of the operator. The bar 55 may be swung about the pivot 61 and the wheel 28 caused to swing about its trunnion 47 and to steer the vehicle when manipulated through the feet of the operator.

In the center of the hood 17 is formed a longitudinally extending slot 64 through which two vertically disposed hand wheels 65 and 66 extend. These hand wheels are shown in detail in Fig. 5. Inasmuch as both of these hand wheels are identical in construction, only the hand wheel 65 will be described in detail. This hand wheel consists of a disk 67 which is formed at its outer end with a curved lip 68. A rim 69 constructed from a separate piece of metal is formed with a flange 70 and with a curved portion 71 cooperating with the lip 68 to form a circular hand grip 72 by means of which the said wheel may be grasped by the operator and manually rotated about its axis. These parts may be spot welded or riveted together through the flange 70 of the part 69. The disk 67 is secured to the hub 73 of a sprocket wheel 74 which is bored at 75 to receive a bolt 76 forming a bearing for rotatably supporting said wheel. The wheel 66 is similarly constructed and is secured to the corresponding part of the other sprocket wheel 77 which is likewise mounted upon the bolt 76 for rotation. These parts are secured together through screws 78 which pass through the said disks of the wheels and are threaded into the hubs of the sprocket wheels.

For the purpose of supporting the bolt 76 a U-shaped supporting member 79 is employed which consists of a base portion 80 and uprights 81 and 82 connected therewith. The base portion 80 rests upon the web 57 of the transverse frame member 56 and is bolted thereto through bolts 83. These uprights are constructed at their upper ends with ears 84 which are bolted to the parts of the hood 18 in proximity to the slot 64 therein through bolts 85. The two uprights 81 and 82 are drilled to receive the bolt 76 which is threaded at its ends to receive nuts 86 by means of which the said bolt is properly held in position. By means of this construction the two hand wheels 65 and 66 are coaxially mounted for independent rotation relative to one another. To prevent injury to the user from the sprockets 74 and 77 a guard 87 is employed which is attached to the hood 17 through a bolt 88 and which is likewise attached to another guard 89 secured to the portion 23 of seat 20. This latter guard includes an upwardly extending wall 90 lying in continuation of the guard 87 and two side members 91 and a back 92, said back being bolted to the member 23 through bolts 93.

The two wheels 27 and 26 are driven through two sprocket wheels 94 and 95 which are attached to the two tubular shafts 32 and 33 near the ends thereof. The said sprockets may be welded or keyed thereto or secured to said shafts in any other suitable manner. Two chains 96 and 97 pass over the two sprockets 94 and 95 and also pass over two idlers 98 and 99 situated at the forward portion of the vehicle. These idlers are disposed in proximity to the two hand wheels 66 and 65 and are journaled for rotation on a shaft 100 mounted in a forked bracket 101. Bracket 101 extends upwardly from and is welded to the box-like member 44 of the transverse frame member 40. The idlers 98 and 99 are constructed in the nature of sheaves and are formed with flanges 102 on the sides thereof spaced sufficiently to receive the respective chains and to hold the same in proper lateral position. The two idlers 98 and 99 are so disposed that the same bring the upper runs 103 of the two chains 96 and 97 into mesh with the teeth of the sprockets 77 and 74, whereby the said sprockets are caused to drive the said chains through engagement with the back sides thereof. By means of this construction an overhand movement of the two hand wheels 65 and 66 toward the occupant seated on the seat 20 causes the wheels 26 and 27 to rotate in a counter-clockwise direction as viewed in Fig. 3 to procure forward propulsion of the vehicle.

To guide the upper run 103 of the two chains 96 and 97 into mesh with the two sprocket wheels 77 and 74, two guide wheels 104 are provided which are journaled on a shaft 105 secured to a bracket 106. This bracket may be constructed in a similar manner to the bracket 101 and is bolted or otherwise secured to the transverse frame member 56.

In the use of my invention the operator is seated upon the seat 20 and extends his legs into the interior of the body 10 in a manner so that the same straddle the two wheels 65 and 66 and rest upon the pedals 155 at the ends of the steering bar 55. By properly manipulating the said steering bar the wheel 28 may be steered to cause the vehicle to travel in the proper direction. While so stationed the operator is in a position to readily grasp the grips 72 of the two wheels 65 and 66 at the upper portion of the same and to draw the said grips toward him and toward the seat 20. This causes rotation of the two hand wheels 65 and 66 in a clockwise direction as viewed in Fig. 3, which rotation is transferred to the chains 96 and 97 whereby rotational movement is imparted to the sprockets 94 and 95 and the two driving wheels 26 and 27. Such manipulation of the two hand wheels 65 and 66 procures rotation of the driving wheels 26 and 27 in a counter-clockwise direction and propulsion of the vehicle in a forward direction, the same being steered as previously explained through the feet of the operator. When the operator wishes to cause reverse propulsion of the vehicle, the wheels 65 and 66 are rotated in the opposite direction. It will be readily noted that the two wheels 65 and 66 extend upwardly above the guard 87 and the body proper of the vehicle where the projecting portions thereof may be readily grasped by the operator and manipulated as desired.

My invention is highly advantageous in that an exceedingly simple construction is provided by means of which propulsion of the vehicle can be procured directly through the physical efforts of the operator. With my invention the chain is maintained in direct contact with the driving sprocket so that traction is at all times afforded. A vehicle constructed in accordance with my invention is easily propelled and steered and can be made to travel at a suitable rate of speed without appreciable effort on the part of the operator. By employing separate hand wheels, one for each driving wheel, the two driving wheels can be separately operated and steering of the vehicle can be more or less accommodated by the proper manipulation of the respective hand wheels. At the same time traction is procured at both driving wheels and the use of a differential drive is eliminated. My invention is extremely neat and attractive in appearance.

Changes in the specific form of my invention, as herein disclosed, may be made within the scope of what is claimed without departing from the spirit of my invention.

Having described my invention, what I claim as new and desire to protect by Letters Patent is:

1. In a wheeled vehicle having two driving wheels, and a seat, two juxtaposed concentrically arranged hand wheels situated forwardly of said seat said hand wheels being independently rotatable with respect to one another and separate transmission means between each of said hand wheels and the driving wheels.

2. In a wheeled vehicle having two driving wheels, and a seat, two juxtaposed concentrically arranged vertically extending hand wheels, said hand wheels being situated forwardly of the seat with their axis extending transversely of the vehicle, and being independently rotatable with respect to one another, transmission means connecting the right hand, hand wheel with the right hand driving wheel and transmission means connecting the left hand, hand wheel with the left hand driving wheel.

3. In a wheeled vehicle, a sprocket, a chain driven by said sprocket and driving the vehicle, and a pair of hand wheels coaxially arranged with respect to said sprocket and disposed one on each side of the same, one of said hand wheels being connected to said sprocket and serving to drive the same, said hand wheels forming a guard for said sprocket.

4. In a wheeled vehicle, two coaxially disposed closely positioned hand wheels, said wheels having juxtaposed spaced rims thereon serving as hand grips, and a power transmission including a sprocket driven from one of said hand wheels, said sprocket being disposed between said hand wheels and guarded thereby.

5. In a wheeled vehicle having a frame and a rear driving wheel for supporting said frame, a seat carried by said frame, a vertically disposed hand wheel situated forwardly of said seat, means for journaling said hand wheel, said means being fixed relative to the frame, and reversing transmission means extending rearwardly from said hand wheel to said driving wheel for causing rotational movement of said driving wheel in one direction upon rotational movement of said wheel in the opposite direction.

6. In a wheeled vehicle, two coaxially disposed hand wheels, said wheels having juxtaposed spaced rims thereon serving as hand grips, and means for driving the vehicle from said hand wheels, said means being disposed in part between said wheels and in such part guarded thereby.

7. In a wheeled vehicle having a frame and a rear driving wheel for supporting said frame, a seat carried by said frame and disposed above said driving wheel, a sprocket on said driving wheel, a chain passing over said sprocket and extending beneath said seat forwardly thereof, an idler sprocket disposed forwardly of said seat and carrying the forward end of said chain, a driving sprocket disposed above said chain forwardly of said seat and engaging the upper run of said chain, and a hand wheel for driving said last named sprocket, said hand wheel having a rim thereon forming a hand grip and disposed so that the upper portion thereof may be drawn toward the occupant of the seat to procure forward propulsion of the vehicle.

8. In a wheeled vehicle having a driving wheel, a seat, two juxtaposed concentrically arranged vertically extending hand wheels, said hand wheels being situated forwardly of the seat with their axis extending transversely of the vehicle, rims formed on said hand wheels and serving as hand grips for rotating the same, power transmission means between one of said hand wheels and said driving wheel for propelling the vehicle, and means operated by the other hand wheel for further propelling the vehicle.

9. In a wheeled vehicle, a rear driving wheel, a seat positioned forwardly of said driving wheel and above the axis of the same, a sprocket wheel coaxially disposed relative to the driving wheel for driving the same, an idler situated forwardly of the seat, a chain passing over said sprocket wheel and idler and extending below said seat, a sprocket wheel positioned above said chain in proximity to the idler and engaging the chain upon the outer portion thereof, and operating the chain in a manner to procure reverse movement of said driving wheel, a hand wheel connected to said second sprocket wheel and concentric therewith, the axis of said hand wheel being disposed above the seat to give ready access thereto by the occupant of the seat.

10. In a wheeled vehicle, a sprocket, a chain driven by said sprocket and driving the vehicle, two discs disposed one on each side of said sprocket and in close proximity thereto, said discs being concentric with said sprocket and of a diameter greater than said sprocket to guard said sprocket, means for driving said sprocket from one of said discs, and hand engaging means on said disc for manipulating said disc to propel the vehicle.

11. In a wheeled vehicle, two coaxially disposed closely positioned spaced discs, transmission means for propelling the vehicle operated by said discs and disposed in part between said discs and in such part guarded thereby, and hand engaging means on said discs for manipulating the same.

12. In a wheel vehicle having rear driving wheels and front steering wheels, a seat disposed toward the rear of the vehicle, steering means at the front of the vehicle for engagement by the feet of the occupant, a pair of concentric juxtaposed hand wheels, arranged medially of the sides of the vehicle so as to be straddled by the legs of the occupant, said wheels being provided with spaced annular hand grips permitting independent hand over hand pull on said hand grips toward the occupant, and power transmission means between said hand wheels and said driving wheels.

13. In a wheeled vehicle having front and rear wheels, a seat disposed toward the rear of the vehicle, a foot rest disposed near the front of the vehicle, a pair of concentric juxtaposed hand wheels arranged in a position to be straddled by the legs of the occupant, said wheels being provided with spaced annular hand grips permitting independent hand over hand pull on said hand grips toward the occupant, and power transmission means for propelling the vehicle and operated by the hand wheels.

NELS H. NELSON.